(12) United States Patent
Hutchinson et al.

(10) Patent No.: US 8,577,280 B2
(45) Date of Patent: Nov. 5, 2013

(54) PROGRAMMED CLASSROOM INSTRUCTION

(76) Inventors: Ronald R. Hutchinson, Augusta, MI (US); Tullio J. Proni, Kalamazoo, MI (US); Joseph V. Brady, Baltimore, MD (US); Grace S. Emley, Augusta, MI (US)

( * ) Notice: Subject to any disclaimer, the term of this patent is extended or adjusted under 35 U.S.C. 154(b) by 0 days.

(21) Appl. No.: 12/802,786

(22) Filed: Jun. 14, 2010

(65) Prior Publication Data

US 2011/0189643 A1  Aug. 4, 2011

Related U.S. Application Data

(63) Continuation of application No. 11/190,176, filed on Jul. 26, 2005, now abandoned, which is a continuation-in-part of application No. 11/025,653, filed on Dec. 29, 2004, now Pat. No. 8,275,305.

(51) Int. Cl.
*G09B 7/00* (2006.01)

(52) U.S. Cl.
USPC ........... 434/350; 434/322; 434/323; 434/353; 434/118

(58) Field of Classification Search
CPC ........................................................ G09B 7/00
USPC .......................... 434/236, 322, 323, 350, 353
See application file for complete search history.

(56) References Cited

U.S. PATENT DOCUMENTS

| | | | |
|---|---|---|---|
| 5,059,127 A | 10/1991 | Lewis et al. | |
| 5,173,051 A | 12/1992 | May et al. | |
| 5,267,865 A | 12/1993 | Lee et al. | |
| 5,295,836 A | 3/1994 | Ryu et al. | |
| 5,310,349 A | 5/1994 | Daniels et al. | |
| 5,597,312 A | 1/1997 | Bloom et al. | |
| 5,727,951 A | 3/1998 | Ho et al. | |
| 5,743,746 A | 4/1998 | Ho et al. | |
| 5,829,983 A * | 11/1998 | Koyama et al. | 434/118 |
| 5,863,208 A | 1/1999 | Ho et al. | |
| 5,864,869 A | 1/1999 | Doak et al. | |
| 5,904,485 A | 5/1999 | Siefert | |
| 5,934,909 A | 8/1999 | Ho et al. | |
| 5,957,699 A | 9/1999 | Peterson et al. | |
| 6,024,577 A | 2/2000 | Wadahama et al. | |
| 6,029,043 A * | 2/2000 | Ho et al. | 434/350 |
| 6,077,085 A | 6/2000 | Parry et al. | |
| 6,091,930 A | 7/2000 | Mortimer et al. | |
| 6,148,174 A | 11/2000 | Remschel | |
| 6,149,441 A | 11/2000 | Pellegrino et al. | |
| 6,164,974 A * | 12/2000 | Carlile et al. | 434/322 |

(Continued)

*Primary Examiner* — Xuan Thai
*Assistant Examiner* — Alvin Carlos
(74) *Attorney, Agent, or Firm* — Miller Canfield Paddock and Stone; Mark L Maki

(57) ABSTRACT

A computer-implemented method of overseeing and adjusting the instruction and evaluation of a student with respect to one or more topics of study within a classroom. The subject matter of an academic course is studied and broken down into a plurality of discretely defined behavioral performances designed to be readily and objectively recognized as being mastered or not by a student. One or more of the discretely defined behavioral performances are then selected, with the aid of a first computerized database system, as learning objectives for the week. At the end of the week, a student is subsequently evaluated on these objectives. Results of the evaluation are then transferred to a second computerized database system, which organizes the collected data into an interactive learning management report that can be configured by a reviewer in real time to display a variety of levels of detail.

23 Claims, 14 Drawing Sheets

(56) References Cited

U.S. PATENT DOCUMENTS

| | | |
|---|---|---|
| 6,201,948 B1 | 3/2001 | Cook et al. |
| 6,270,351 B1 | 8/2001 | Roper |
| 6,306,086 B1 | 10/2001 | Buschke |
| 6,322,366 B1 | 11/2001 | Bergan et al. |
| 6,438,353 B1 * | 8/2002 | Casey-Cholakis et al. ... 434/350 |
| 6,468,085 B1 | 10/2002 | Bergan et al. |
| 6,470,170 B1 * | 10/2002 | Chen et al. .................. 434/350 |
| 6,505,031 B1 | 1/2003 | Slider et al. |
| 6,533,583 B1 | 3/2003 | Sportelli |
| 6,554,618 B1 | 4/2003 | Lockwood |
| 6,606,480 B1 * | 8/2003 | L'Allier et al. .............. 434/362 |
| 6,643,493 B2 | 11/2003 | Kilgore |
| 6,651,071 B1 | 11/2003 | O'Brien et al. |
| 6,678,500 B2 | 1/2004 | Helmick et al. |
| 6,729,885 B2 | 5/2004 | Stuppy et al. |
| 6,793,498 B1 * | 9/2004 | Nunes .......................... 434/322 |
| 6,808,392 B1 * | 10/2004 | Walton ......................... 434/236 |
| 6,863,535 B2 * | 3/2005 | Krasney ....................... 434/236 |
| 6,978,115 B2 | 12/2005 | Whitehurst et al. |
| 7,052,277 B2 * | 5/2006 | Kellman ...................... 434/118 |
| 2001/0031456 A1 | 10/2001 | Cynaumon et al. |
| 2002/0142278 A1 | 10/2002 | Whitehurst et al. |
| 2002/0160350 A1 | 10/2002 | Tanaka et al. |
| 2002/0177109 A1 | 11/2002 | Robinson et al. |
| 2002/0178038 A1 | 11/2002 | Grybas |
| 2003/0008268 A1 | 1/2003 | Thomas |
| 2003/0044762 A1 | 3/2003 | Bergan et al. |
| 2003/0087219 A1 | 5/2003 | Berger et al. |
| 2003/0140021 A1 | 7/2003 | Ryan et al. |
| 2004/0009461 A1 | 1/2004 | Snyder et al. |
| 2004/0033475 A1 | 2/2004 | Mizuma et al. |
| 2004/0110119 A1 | 6/2004 | Riconda et al. |
| 2004/0115596 A1 | 6/2004 | Snyder et al. |
| 2005/0196730 A1 * | 9/2005 | Kellman ...................... 434/118 |

* cited by examiner

| Item Number | Reading Objectives |
|---|---|
| RE1-1 | Identify all capital letters of the alphabet |
| RE2-1 | Identify all lower case letters of the alphabet |
| RE3-1 | Identify beginning consonant sounds: d, m, s |
| RE4-1 | Identify ending consonant sounds: d, m, s |
| RE5-1 | Identify beginning consonant sounds: b, g, t |
| RE6-1 | Identify ending consonant sounds: b, g, t |
| RE7-1 | Identify beginning consonant sounds: f, l, n |
| RE8-1 | Identify ending consonant sounds: f, l, n |
| RE9-1 | Identify beginning consonant sounds: k, p, r |
| RE10-1 | Identify ending consonant sounds: ck, p, r |
| RE11-1 | Identify beginning consonant sounds: h, j, w |
| RE12-1 | Identify beginning consonant sounds: c, v, y |
| RE13-1 | Identify ending consonant sounds v(e), y |
| RE14-1 | Identify beginning consonant sounds: qu, z, (e)x ( i.e. exit, exercise, exciting) |
| RE15-1 | Identify long vowel sound a |
| RE16-1 | Identify short vowel sound a |
| RE17-1 | Identify long vowel sound e |
| RE18-1 | Identify short vowel sound e |
| RE19-1 | Identify long vowel sound o |
| RE20-1 | Identify short vowel sound o |

FIG. 1 FIRST GRADE READING OBJECTIVES

| Item Number | Science | Objectives |
|---|---|---|
| SC1-1 | List three needs of all animals | |
| SC2-1 | Identify animals as meat-eaters, plant-eaters, or both | |
| SC3-1 | Identify animals that are extinct | |
| SC4-1 | Describe how teeth are different for meat-eaters and plant-eaters | |
| SC5-1 | List two needs of plants | |
| SC6-1 | Explain how seeds grow | |
| SC7-1 | Define "habitat" | |
| SC8-1 | Describe plants and animals that live in the desert | |
| SC9-1 | Describe plants and animals that live in swamps | |
| SC10-1 | Describe plants and animals that live in the rain forest | |
| SC11-1 | Describe plants and animals that live in the ocean | |
| SC12-1 | Name one distinguishing characteristic for mammals | |
| SC13-1 | Name one distinguishing characteristic for birds | |
| SC14-1 | Name one distinguishing characteristic for fish | |
| SC15-1 | Name one distinguishing characteristic for reptiles | |
| SC16-1 | Name one distinguishing characteristic for amphibians | |
| SC17-1 | Name one distinguishing characteristic for insects | |
| SC18-1 | Name two creatures that lay eggs | |
| SC19-1 | Name two creatures that change dramatically from their birth into adulthood (i.e. frogs) | |
| SC20-1 | Give two examples of how plants and animals help each other | |

FIG. 2 FIRST GRADE SCIENCE OBJECTIVES

| Item Number | Social Studies | Objectives |
|---|---|---|
| SS1-1 | | Describe people who can make up a family |
| SS2-1 | | Name two different ways a family can work together |
| SS3-1 | | Name two family rules |
| SS4-1 | | Explain why families have rules |
| SS5-1 | | Demonstrate proficiency at reading a chart to answer questions |
| SS6-1 | | List two "needs" of all people |
| SS7-1 | | Demonstrate proficiency at reading a floor plan to answer questions |
| SS8-1 | | List two possible "wants" of people |
| SS9-1 | | Identify an item as a "want" or "need" of people from a given list (i.e. food, shelter, PS2) |
| SS10-1 | | Define the word "neighborhood" |
| SS11-1 | | Know complete address including city and state |
| SS12-1 | | Know complete phone number including area code |
| SS13-1 | | Demonstrate proficiency at reading a map key to answer questions |
| SS14-1 | | Define the components of a community |
| SS15-1 | | Locate North America on a globe and map |
| SS16-1 | | Locate the United States on a globe and map |
| SS17-1 | | Locate Michigan on a globe and map |
| SS18-1 | | List and locate the Great Lakes |
| SS19-1 | | Name two facts about Michigan |
| SS20-1 | | Distinguish between plains and mountains |

FIG. 3 FIRST GRADE SOCIAL STUDIES OBJECTIVES

Weekly Evaluation Report
Academy

Student, Test          Teacher          Week of 12/6/04

Appropriate Conduct

| AC28-1 | Claim an appropriate share of the teacher's attention | 2 |
|---|---|---|

Library/Technology

| LT4-1 | Demonstrate respect for library materials by proper care and timely return | 2 |
|---|---|---|

Math

| MA31-1 | Identify and create symmetry in shapes and patterns | 2 |
|---|---|---|
| MA42-1 | Determine whether a figure is open or closed | 2 |
| MA46-1 | Identify figures that are congruent | 2 |

Music

| MU6-1 | Memorize a melody and be able to sing it independently | 2 |
|---|---|---|

Reading

| RE23-1 | Identify long vowel sound i | 2 |
|---|---|---|
| RE24-1 | Identify long vowel sound u | 2 |

Science

| SC16-1 | Name one distinguishing characteristic for amphibians | 2 |
|---|---|---|
| SC17-1 | Name one distinguishing characteristic for insects | 2 |

Social Studies

| SS7-1 | Demonstrate proficiency at reading a floor plan to answer questions | 2 |
|---|---|---|

Writing

| WR11-1 | Write a complete sentence on a given topic using proper capitalization and punctuation | 1 |
|---|---|---|

Teacher Notes:
We have one more week before winter break. We will be practicing hard for our Holiday Program! Test student did a wonderful job in writing this week! I am very proud of him. He does need to continue working on reading numbers from 0-100. Test student also worked hard to memorize facts about animals.

KEY: 1 = Teaching and learning of this objective is in progress.    2 = Teaching and learning of this objective is compl This document is the property of the Foundation for Behavioral Resources. All rights are reserved    Page 1

FIG. 5

Academy Quarterly Progress Report
Student Test 2004 - 2005 School Year

NAME: Student, Test

CLASS: Teacher 1st

| Quarter | Initials | Date |
|---|---|---|
| 1st | ___ | ___ |
| 2nd | ___ | ___ |
| 3rd | ___ | ___ |
| 4th | ___ | ___ |

Our Mission Statement

The mission of the Academy is to provide a high quality educational program focusing on core knowledge and skills in language arts, mathematics, art, science, social studies, conduct, and health. To accomplish this, a sequence of objectives has been developed to provide a clear outline of specific content to be learned at each grade level. The educational family at the Academy has established high expectations for all students with the goal of mastery level achievement for each learner by the end of the school year.

ASSIGNMENT FOR NEXT YEAR

Assigned to ___ grade for the ___ school year

Teacher Signature _____ Date ___

ATTENDANCE

| Period | 1st | 2nd | 3rd | 4th |
|---|---|---|---|---|
| Days Absent | | | | |
| Days Tardy | | | | |
| Total School days | | | | |

Appropriate Conduct

| Item number | | 1st quarter | 2nd quarter | 3rd quarter | 4th quarter |
|---|---|---|---|---|---|
| AC1-1 | Arrive to on time, ready to commence learning | 2 | | | |
| AC2-1 | Remain in school the full instructional time to maximize learning | 2 | | | |
| AC3-1 | Arrive to school in uniform | 2 | | | |
| AC4-1 | Remain neat and well-groomed throughout the school day | 2 | | | |
| AC5-1 | Speak in a respectful tone to adults | | | | |
| AC6-1 | Demonstrate respect for adults and peers | 2 | | | |
| AC7-1 | Demonstrate knowledge of the difference between tattling and telling important information | 1 | | | |
| AC8-1 | Demonstrate respect for school property and the property of others | | | | |
| AC9-1 | Follow school and classroom rules | 2 | | | |
| AC10-1 | Demonstrate appropriate manners: "please", "thank you", and "excuse me" | 2 | | | |
| AC11-1 | Demonstrate appropriate table manners by chewing with mouth closed | 2 | | | |
| AC12-1 | Demonstrate appropriate table manners by choosing appropriate topics of conversation | 2 | | | |
| AC13-1 | Demonstrate appropriate table manners by cleaning up after self when done eating | 2 | | | |

This document is the property of the Foundation for Behavioral Resources.
All rights are reserved.

Page 1

Learning Management Report

◀ Review ▶

Performance Ranges

Learn % / Teach % = Grade %

| School Year | Updated through | ◀ School ▶ | Room | ◀ Grade ▶ | Teacher | ◀ Ranking Criterion ▶ |
|---|---|---|---|---|---|---|
| 2004-2005 | Week 14 - 12/3/04 | Academy | A1 | 3rd | Doe | Average - Grade % |

GRADE %  LEARN %

| | Appropriate Conduct | | Art | | Health | | Library/Technology | | Listening/Speaking | | Math | | Music | | Reading | | Science | | Social Studies | | Study Skills | | Writing | | Average | |
|---|---|---|---|---|---|---|---|---|---|---|---|---|---|---|---|---|---|---|---|---|---|---|---|---|---|
| Student A | 100 | 45 | 94 | 39 | 100 | 42 | 100 | 40 | 100 | 48 | 100 | 39 | 100 | 37 | 98 | 39 | 100 | 41 | 90 | 35 | 100 | 50 | 100 | 42 | 99 | 41 |
| Student B | 94 | 43 | 100 | 41 | 100 | 42 | 100 | 40 | 100 | 48 | 100 | 39 | 100 | 37 | 98 | 39 | 100 | 41 | 90 | 35 | 100 | 50 | 100 | 42 | 99 | 41 |
| Student C | 100 | 45 | 100 | 41 | 100 | 42 | 100 | 40 | 100 | 48 | 95 | 37 | 100 | 37 | 95 | 38 | 100 | 41 | 90 | 35 | 100 | 50 | 100 | 42 | 98 | 41 |
| Student D | 100 | 45 | 100 | 39 | 100 | 42 | 100 | 40 | 100 | 48 | 97 | 38 | 100 | 37 | 93 | 37 | 98 | 40 | 88 | 35 | 100 | 50 | 99 | 41 | 98 | 41 |
| Student E | 100 | 45 | 94 | 39 | 100 | 42 | 100 | 40 | 100 | 48 | 98 | 38 | 100 | 37 | 93 | 37 | 100 | 41 | 76 | 30 | 100 | 50 | 99 | 41 | 97 | 41 |
| Student F | 97 | 44 | 89 | 36 | 100 | 42 | 100 | 40 | 95 | 46 | 100 | 39 | 100 | 37 | 90 | 36 | 95 | 39 | 90 | 35 | 100 | 50 | 99 | 41 | 96 | 40 |
| Student G | 100 | 45 | 100 | 41 | 91 | 38 | 100 | 40 | 100 | 48 | 95 | 37 | 100 | 37 | 90 | 36 | 92 | 37 | 90 | 35 | 100 | 50 | 96 | 40 | 96 | 40 |
| Student H | 100 | 45 | 100 | 41 | 91 | 38 | 100 | 40 | 91 | 43 | 97 | 38 | 100 | 37 | 95 | 38 | 100 | 41 | 90 | 35 | 93 | 46 | 100 | 42 | 96 | 40 |
| Student I | 100 | 45 | 94 | 39 | 93 | 39 | 100 | 40 | 100 | 48 | 94 | 36 | 100 | 37 | 76 | 30 | 80 | 32 | 85 | 34 | 100 | 50 | 97 | 41 | 94 | 39 |
| Student J | 94 | 43 | 94 | 39 | 100 | 42 | 100 | 40 | 100 | 48 | 98 | 38 | 100 | 37 | 79 | 31 | 83 | 34 | 71 | 28 | 100 | 50 | 99 | 41 | 93 | 39 |
| Student K | 86 | 39 | 89 | 36 | 100 | 42 | 100 | 40 | 95 | 46 | 81 | 31 | 100 | 37 | 88 | 35 | 85 | 34 | 75 | 30 | 100 | 50 | 99 | 41 | 92 | 38 |
| Student L | 94 | 43 | 94 | 39 | 91 | 38 | 69 | 28 | 86 | 41 | 79 | 31 | 100 | 37 | 88 | 35 | 83 | 34 | 84 | 33 | 100 | 50 | 95 | 40 | 89 | 37 |

☐ Grade < 75%   Additional Instruction Necessary

FIG. 12

Learning Management Report

◄ Review ►

Class Log

| School Year | Updated through | ◄ School ► | Room | ◄ Grade ► | Teacher |
|---|---|---|---|---|---|
| 2004-2005 | Week 14 – 12/3/04 | Academy | A1 | 3rd | Ms Doe |

◄ Subject ►

| Appropriate Conduct | Taught | 45% |
|---|---|---|

Average Weekly Learning (X10)

*(Table of objectives AC1-3 through AC40-3 with weekly learning values plotted across columns Last, 1–41)*

☐ Learning < 75%  ☐ Additional Instruction Necessary

FIG. 13

PROGRAMMED CLASSROOM INSTRUCTION

CROSS REFERENCE TO RELATED APPLICATION

This application is a continuation of U.S. Ser. No. 11/190,176, filed Jul. 26, 2005 now abandoned, which is a continuation-in-part of our application Ser. No. 11/025,653, filed Dec. 29, 2004 now U.S. Pat. No. 8,275,305, and entitled "PROGRAMMED CLASSROOM INSTRUCTION".

FIELD OF THE INVENTION

The present invention generally relates to a system of management of education suitable with conventional classrooms and schools by adaptation of the teaching and learning process into a programmed digital process compatible with advances in information technology. More specifically, the present invention describes an integrated set of methods and instruments useful for the continuous oversight and adjustment of the classroom educational process.

BACKGROUND OF THE INVENTION

In recent years, innovative practices in general education have begun to emphasize learning methods characterized by higher degrees of specificity. Course syllabi may be divided into dozens, even hundreds of detailed teaching/learning units. The influences fostering these efforts derive from several different sources. Personnel management planning sometimes attempts to spell out instructional responsibilities to teachers for the school year. Alternatively, efforts by academic designers have led to development of precise instructional sub routines such as programmed texts.

Though detailed teacher job assignments provide more careful exposition of performance expectations, there has been a universal failure to provide adequate instruments and methods for tracking the more elaborate performances expected. Alternatively, previous attempts to develop the technically advanced learning guidance and assessment systems such as programmed texts, have produced materials for individual student use but offer no system of teacher support and guidance in normal classroom circumstances.

The present method adapts and integrates features from these different genres to produce a unique multi part system of detailed management influence and oversight suited to conventional classroom and school settings.

SUMMARY OF THE INVENTION

An integrated system and set of methods for the continuous oversight and adjustment of the classroom educational process. Included within the system and set of methods is 1) a particular system and method of precise fractionation of educational goals into discrete units best suited for learning. 2) A system and method for standardizing and organizing the discrete learning units into teaching and learning procedures. 3) A system and method for accurately observing and measuring and improving learning progress of these discrete learning units. 4) A system and method for automatically analyzing and then frequently presenting to remotely located managers, a complete description of the progress and current achievement levels of individual students, classroom groups, and entire schools. This system and set of methods in summary is termed—PROGRAMMED CLASSROOM INSTRUCTION.

BRIEF DESCRIPTION OF THE DRAWINGS

FIG. 1 is a partial list of "reading" learning units that are the result of a process of fractionation of educational subject matter, that, when taken as a whole, define the reading skills that, upon selection, become the teaching and learning objectives for reading for a first grade student.

FIG. 2 is a partial list of "science" learning units that are the result of a process of fractionation of educational subject matter, that, when taken as a whole, define science skills that, upon selection, become the teaching and learning objectives for science for a first grade student.

FIG. 3 is a partial list of "social studies" learning units that are the result of a process of fractionation of educational subject matter, that, when taken as a whole, define the social studies skills that upon selection become the teaching and learning objectives for Social Studies for a first grade student.

FIG. 5 is an illustration of the WEEKLY EVALUATION REPORT portion of the present invention. Following weekly observation, detection and computer entry of completed learning (mastery) of learning units, results are automatically printed as this report and delivered to parents.

FIG. 7 is an illustration of the QUARTERLY PROGRESS REPORT portion of the present invention, such as are distributed to parents.

FIG. 10 is an illustration of the STUDENT LOG generated by the LEARNING MANAGEMENT REPORT of the present invention.

FIG. 12 is an illustration of the STUDENT/CLASS PERFORMANCE RANGES generated by the LEARNING MANAGEMENT REPORT of the present invention.

FIG. 13 is an illustration of the CLASSROOM LOG generated by the LEARNING MANAGEMENT REPORT of the present invention.

DETAILED DESCRIPTION OF THE INVENTION

Figure 4:
FIG. 4 is an illustration of the WEEKLY PREVIEW portion of the present invention. Following teacher selection of learning units from the computer library (lesson plan), as teaching objectives for the following week, and installing any parent communications, the plan is printed as the WEEKLY PREVIEW and distributed to all parents.

I. Defining the Measurable Components of Knowledge in Digital Format

The present invention begins by the establishment of a computer assisted method of designating precisely the exact components of knowledge and their organization which constitutes a desirable state of education and skill for a particular grade level and subject matter in general education. The required analysis selects discrete, observable, behaviors which represent, when learned, complete knowledge elements and/or combinations of elements. The process further organizes these knowledge elements according to structural and functional groupings as well as conventional levels of advancement. The result of this definitional process is the establishment of a large group of unique, individually described behaviors or learning units, which are so specific that a teacher can select any one as an explicit teaching objective and then definitively teach, and thereafter recognize the presence or absence of this behavior by a student.

This elaborate definitional process may be characterized as defining desirable knowledge by its overt behavioral representation and then fractionating these behaviors into a digitally compatible format.

The logical process of digitizing complex subject matter has been beneficially employed in numerous other scientific and technical disciplines with the intent of harnessing the greater power of measurement systems that utilize discrete detection and management logic and apparatus for iteration and compilation. Traditionally many complex phenomena that were viewed as continuous and multi-dimensional, were thought to be subject only to analogical methods of measurement, i.e. sound, light, etc. However, by applying digital techniques of fragmentation into multiple distinct units, sound, light, and now, even academic repertoire, become addressable by systems of precise detection, measurement, and in consequence, management.

In the present invention, therefore, prior to the initiation of an academic course of study, the subject matter of the course is analyzed in detail and broken down into a plurality of discretely defined behavioral performances suitable for "yes-no" recognition, which are thereafter established as teaching objectives. Once compiled, the large volume of objectives are stored in a library of learning elements categorized by general subject matter and estimated difficulty level available for selection from a classroom guidance computer.

Three sets of learning elements (teaching objectives) are depicted in table format in FIGS. 1-3, respectively, for purposes of example. The table of FIG. 1 depicts some of the learning units available for choice as reading objectives for a first-grade student. Similarly, the tables of FIGS. 2 and 3, respectively, depict sample sets of learning units relevant to the teaching and learning of science and social studies for a first-grade student.

II. Establishing Performance Measurement in a Digital Format

Traditional academic planning and grading systems employed by teachers universally treat educational subject matter as continuous repertoire and typically attempt precision by direct analogical measurements based on multi-dimensional standards. Subsequently, teachers average these measurements in some fashion and then give one summary grade for an entire subject of study. The use of digital procedures by the present invention improves upon the traditional systems and methods because each explicit and unique objective can be accurately identified, more uniformly taught, and the resulting learning more accurately and consistently detected and mathematically compiled by the instructor. A student's performance within the classroom can not only be trained and evaluated in a more objective manner, deficiencies of performance are also more readily identified and isolated due to the high level of detail and clarity by which each objective is defined.

Consider the following example to illustrate the above point. A first grade student's reading ability is evaluated over the course of three weeks. Under a traditional academic planning and grading system, the student earns a "B+" grade for the first week, a "B" grade for the second week, and an "A−" grade for the third week, resulting in a cumulative "B+" grade for the three week period. Except for the obvious fact that the student has earned a respectable grade, no other detail concerning the student's reading ability, including the areas in which he or she may still be deficient, can be determined by the above traditional system.

Alternatively, over the same three week period, a second student's reading proficiency is evaluated by the present invention, on the basis of the 20 teaching objectives listed in the table of FIG. 1. At the end of the three weeks, the second student has demonstrated proficiency in 17 of the 20, or roughly 85%, of the listed objectives. In addition to the fact that the second student has achieved a respectable level of proficiency over the three week period, it has also been determined that the second student is having problems identifying the consonant sounds d, m and s (Item Numbers RE3-1 and RE4-1) and identifying consonants that can sound alike (Item Number RE13-1), thereby precisely indicating what supplementary teaching is necessary.

Because traditional academic planning and grading systems typically consider academic subject matter to be a continuous datum and thereafter assess a student's performance as a matter of degree, reliance is made upon scales and measurement along continua. One common example, as already demonstrated in the example above, is the "A" through "F" letter grading scale in which a student earns a grade of "A", "B", "C", "D" or "F" depending on the student's evaluated proficiency in a topic. Frequently the number of levels or degrees in this grading scale is further expanded by assigning a "plus" or "minus" to most of the letter grades, such as, for instance, a grade of "B+" or "C−".

Unfortunately, these traditional grading schemes tend to be quite subjective in their implementation. One instructor might assess a certain level of performance by a student as deserving a grade of "A−", while a second instructor might evaluate the exact same level of performance as only deserving a grade of "B+". Because these traditional grading schemes are inaccurate, it is difficult to compare the performance level achieved by two or more students. Such ambiguities have also stymied any development of automatic performance measurement and analysis.

The academic planning and grading system of the present invention confirms learning performance relative to a learning unit standard as mastered or not, i.e., as a matter of kind rather than as a matter of degree. When a teacher selects certain knowledge units to be the learning objectives of the current week, a state of "teaching and learning has begun" is automatically established for each student and each objective chosen in the gradebook section of the classroom guidance computer. Then at the end of the week, each student is evaluated by the teacher in reference to the week's learning objectives. A student is evaluated on the basis of either having mastered an objective or not (roughly equivalent to a traditional grade of A or A+). Consider, once again, the example of a first grade student being evaluated on the basis of the 20 objectives listed in the table of FIG. 1. If the student demonstrates completed learning of all but one of the listed objectives, he or she would earn 19 scores of "2" and one score of "1".

Advantages in adopting a digital, all or nothing, definitional criterion and detection system include the ability to use a single quantitative method and common scales to express, examine, and compare not only variations in performances within a single group or class of students, but also, variations in performances in different curricula and different aged students, and in different instructional settings.

The scoring system of the present invention accurately recognizes the potential ambiguity of "0" (zero)—as indicating either a lack of mastery subsequent to teaching, or, a lack of mastery prior to teaching. This is clarified by employing a three state system: —0— "Teaching not yet begun"; —1— "Teaching and Learning have begun", i.e. the week's objectives are chosen and the week of presentation is proceeding (but learning is not complete); —2—, "teaching and learning are complete". By this method, the separate performances of teacher and student are recorded by "1's" and "2's".

III. A Classroom Guidance System Designed for the Teaching of Subject Matter Prepared in Digital Format There are several inherent consequences of redesigning the extensive and complex subject matter of education into large numbers of discrete units. One is to establish both the opportunity and the imperative for time and labor saving methods. To this end, the application of modern digital systems and personal computers for recording basic teaching and learning information has already been covered. The lesson planning and gradebook components described above would, by themselves, be useful and, indeed have been developed by others in various other forms as teacher aids. In the present invention, however, they are basic components of an integrated system of educational management which takes account of, and is adapted to several prominent consequences of the digital design of education.

Establishing numerous, simplified, learning units, leads teachers to take frequent, specific instructional and observable actions. Since these responses are accomplished on a classroom computer, software design affords the opportunity to provide guidance and measurement of the teaching and the learning process. The academic character, temporal dimensions, and coincidence with the past and current conditions of the classroom setting relative to teacher and student performances will be recorded and, as a result, can be reviewed by the teacher and other responsible managers.

In the present method, as in many educational settings, one or more teachers and teacher assistants are primarily responsible for the educational progress of a classroom of 10 to 20 children of generally similar ages and academic backgrounds. Distinct from typical classrooms however, the present method assumes one person designated as an on site education manager. In the present invention, the teacher in charge is a member of a larger management team collectively responsible for and actively participating weekly in the educational events of the classroom. These other managers participate remotely and maintain oversight with the managing teacher by computer linkage. The classroom computer may be described as the classroom guidance computer while other distant information stations are termed the remote management computers.

The academic management system of the present invention is thus implemented through the use of two distinct computerized database systems. The first computerized database resides within a local, management programmed, classroom guidance computer. The second computerized database is a remote system associated with a school district office or other school administrative body, which generally functions as a secondary data repository, as a data management and analysis tool, and as an information distribution network controller for remote management participation.

To facilitate the transfer of data between the two databases, each database system connects to either a local area network (LAN) and/or wide area network (WAN). Alternatively, the two database systems may communicate with one another by means of a direct connection, such as, for example, a dedicated fiber optic line.

Every academic class or instructional course is divided into a number of instruction and evaluation periods. For purposes of this discussion, it will be assumed that management has settled upon periods equivalent to a standard school week.

At the beginning of every week, the instructor accesses the lesson planning portion of the classroom guidance computer and selects one or more learning units as objectives from the management established database. The instructor then initiates a weekly lesson plan on the classroom guidance computer which incorporates the selected objectives via a software format and portrays the information on a screen. Coincidentally, these academic scheduling choices are presented on remote management computers. In an alternative embodiment, the selection of learning units would not be carried out by the instructor, but would be predetermined by the management software.

The lesson plan of the week is subsequently printed out as a WEEKLY PREVIEW report which is distributed to parents. As illustrated in FIG. 4, the WEEKLY PREVIEW report includes, among other things, a listing of the various objectives that make up the lesson plan for that week. In this manner, parents are incorporated into the management group, and are informed of the forthcoming instructional sequence prior to its onset. FIG. 4 also illustrates that the WEEKLY PREVIEW report incorporates a section for the instructor to produce communications for the parents.

Once objectives have been determined and announced to the parents, a "state change" termed "teaching has begun", is automatically entered for each student for the chosen objectives into the gradebook (a score of "1").

IV. A Classroom Guidance System Suitable for Accurately Observing and Measuring Learning of Subject Matter in Digital Format At the end of the instructional period, (typically a week), the instructor evaluates each student's performance for each of the period's objectives and enters the results into the classroom guidance computer (i.e., no entry if the student needs to continue to work on the specific objective, or a 2 to indicate that the student has learned thoroughly (mastered) the specific objective. Evaluation results for each student are automatically distributed to the administration computer system. Here the "2" score for "learning complete" updates the "1" score for "teaching and learning begun". A WEEKLY EVALUATION REPORT, illustrated in FIG. 5, is then generated for each student and distributed to each student's parents at the end of the week. This element of the management software design guarantees the continual parent/manager oversight to help assure constant examination of the educational process. Similar to the WEEKLY PREVIEW report, the WEEKLY EVALUATION REPORT lists the specific objectives that the class covered over the course of the week, along with the learning evaluation (i.e., grades) as well as any new comments by the instructor.

Figure 6:
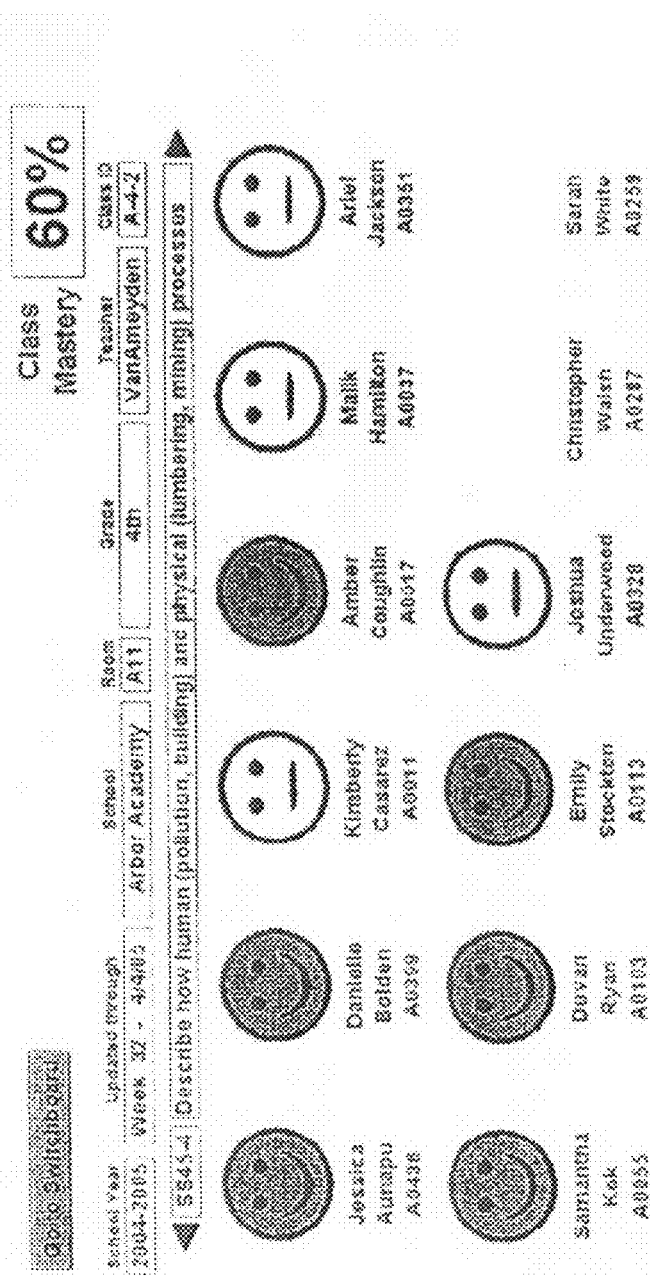
FIG. 6 is an illustration of the Classroom Teaching Chart portion of the present invention. Following selection of the weekly learning objectives, the instructor may call up, and adjust, as learning progresses, this display of current learning status for each child and for the entire classroom, and for each selected learning objective.

An alternative embodiment of the system allows the instructor to access a Classroom Teaching Chart. This establishes a real time recording system for continuous use throughout the instructional week. The Classroom Teaching Chart provides a visual representation of all students in the class and the current state of learning for each chosen objective for each student. As illustrated in FIG. 6, the Classroom Teaching Chart is organized into a series of picture panels labeled individually with each student's name. When the teacher commences teaching of an objective and begins observation of a student, the teacher "clicks" upon the appropriate picture panel. This action causes a cartoon-face representation of the student to appear in the picture panel. The facial demeanor of the cartoon representation is neutral. A score of 1 is now entered in the grade registry indicating a state of "teaching and learning has begun". Later, when the instructor evaluates a student's learning progress on the objective, and a student demonstrates mastery, a further click on the student's picture panel causes a change of the cartoon face from one color to another (for example yellow to green) and a change in the facial demeanor from neutral to broadly smiling. Alternatively, should the instructor's judgment be a revision from a previous estimate of mastery to an evaluation of in progress, a "click" will reverse the facial expressions and color to their previous state.

At the top of the Classroom Teaching Chart is an additional panel which presents a continuously adjusted, cumulative total mastery score for the entire class of students.

The instructor may move from one objective to another at different periods in the day by simply clicking on the objective navigation bar (either forward or backward) near the top of the chart. When the instructor chooses to employ this portion of the system, performance evaluations are continuously updated. Since evaluations are always currently accurate, no separate "end of week" grading procedure is necessary.

By use of the Classroom Teaching Chart the instructor knows immediately, and always, the current learning status of each student, and of the entire class for the objective of current classroom interest. The capability of this alternative embodiment for establishing an immediate relation between a learned response and further consequences, by automatic means, fulfills a necessary condition for learning and thereby provides a powerful supplemental tool for the instructor. By employment of a recording system in "real time" the system can be utilized to automatically produce a variety of alternate nonverbal forms of recognition and reward of student learning performance. For example, the occasion of an instructor recording learning mastery can produce feedback to individual students by novel signals, direct private or public delivery of rewards, or the automatic recording of earned rewards in a computer assisted "bank account".

At appropriate intervals throughout the academic year, the gradebook system also generates and distributes to the parents a QUARTERLY PROGRESS REPORT for each student. FIG. 7, illustrates a sample of the QUARTERLY PROGRESS REPORT, which lists the entire year's objectives and the learning evaluation for each specific objective covered to date.

When a student is evaluated on an objective two or more times sequentially over the course of the year, the latter evaluation or grade does not erase the record of previous scores. Instead, all grades are recorded and saved in their appropriate temporal position of the ongoing record. If, during the first quarter, a student is being taught an objective and is scored a 1, then this grade will carry through for the entire year unless and until the student is re-evaluated at a later point in time. If, for example, the student is re-evaluated during the second quarter on the same objective and now demonstrates learning mastery, a score of 2 is recorded. This second grade now remains for the rest of the year unless the student is again later evaluated and earns a lesser grade.

Figure 8:
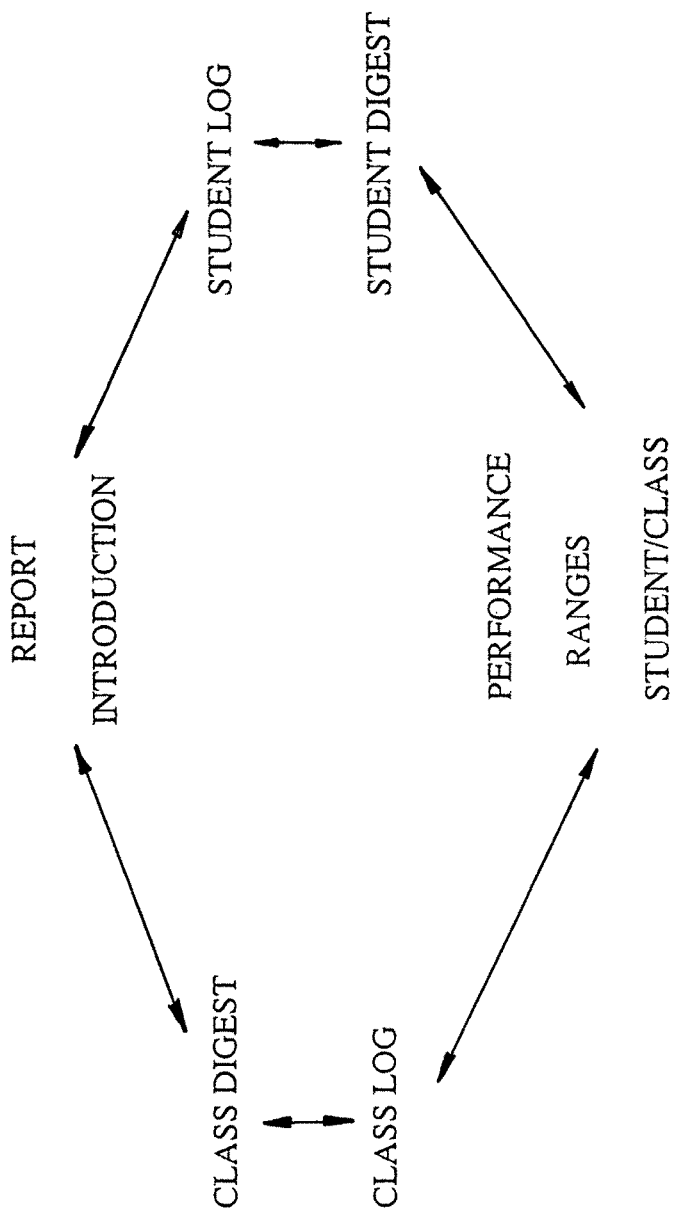
FIG. 8 is a flow diagram of the serial order and generalization-specialization options of the data presentations of the LEARNING MANAGEMENT REPORT of the present invention.

V. A System for Automatically Analyzing and then Frequently Presenting to Remotely Located Managers, a Complete Description of the Progress and Current Achievement Levels of Individual Students, Classrooms, and Schools On Friday, the week's data for all classrooms is entered into the gradebook section of the classroom guidance computers and a server collectively transmits the week's data to the remote administration computer system. There, all the teaching and learning information for each student is assembled into a series of information formats (graphs), which are then transmitted to selected, remote management observation stations. There, various navigation "tools" are provided to the viewer to sort, filter and display the data according to various review priorities. This entire compiled, illustrated, and navigable educational database is titled THE LEARNING MANAGEMENT REPORT. A cardinal feature of THE LEARNING MANAGEMENT REPORT is its bidirectional organization allowing viewer examination from the specific to the general or vice versa. Review can begin with an individual student in a selected curriculum, forward to progressively more generalized reports such as the overall performance of entire classrooms for all curricula. Alternatively, the viewer may start from the general analysis and move toward subsidiary information. This is accomplished by a ring of reports addressable in either direction, starting from an introductory panel. The information presentation sequence of the present invention is illustrated in FIG. 8.

Additional graphic presentations for entire multiple classroom grades, entire school buildings, etc. or alternatively, individual student special instruction routines, are inserted, either as subroutines, or directly within the main navigation ring at the appropriate position in the sequence. Graphic presentation may be by direct screen viewing and automatic network distribution or by printer production and physical distribution. Navigation across and within data subsets is arranged by incorporating a "point and click" rubric, using the computer keyboard and/or mouse. The viewer chooses data presentation by moving the mouse pointer to a specific option target as selected from a multilevel data-command target bar. Navigational options are large, high visibility, target spaces highlighted by arrow shaped (< >) movement signals. The user points the mouse to such a target and "clicks" the command button for data set advance or retreat. By using the scrolling feature of the mouse, the viewer can extend examination through lengthy objective sequences which are more extensive than presentable in entirety on a single screen. By this system it is possible to rapidly scan and study entire learning repertoires for either individual students or entire classrooms, etc.

Figure 9:
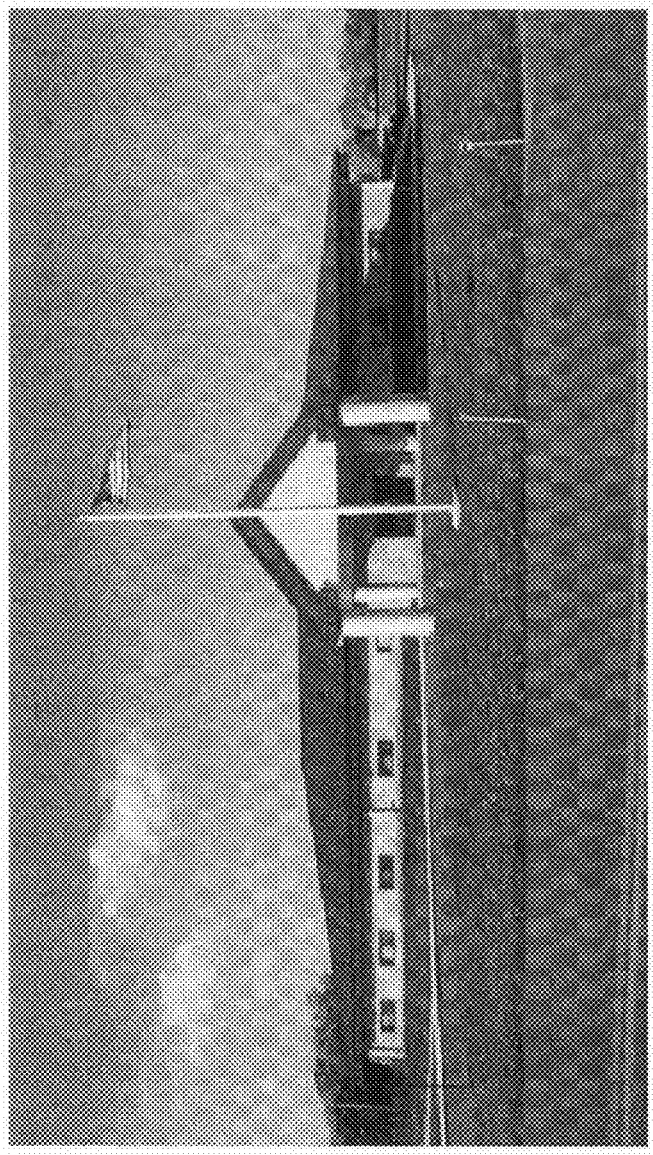
FIG. 9 is an illustration of the introductory panel of the LEARNING MANAGEMENT REPORT of the present invention.

Considering the graphic series of reports from specific to general, the first presentation panel of the LEARNING MANAGEMENT REPORT, an example of which is shown in FIG. 9, is the report introduction cover. This panel is useful for background information, advisories of current issues, etc. and log in security clearances. It also serves to position the viewer to begin an examination from the general or from the specific point of reference. The viewer begins the inquiry by "clicking" the mouse on the target of interest and proceeding.

Figure 10:
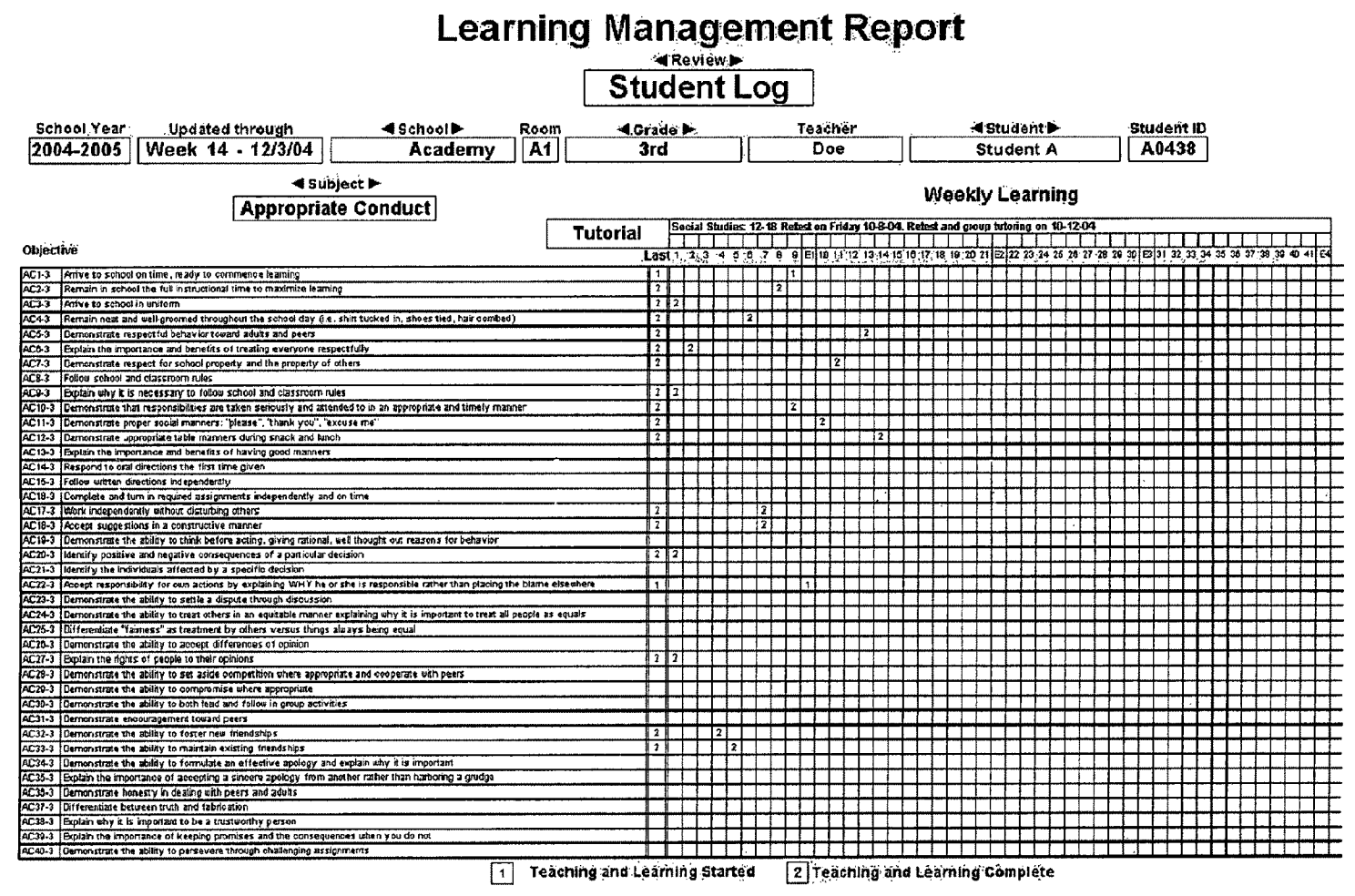

If the viewer chooses to begin with specific detail, the first report shown is the STUDENT LOG. The illustrated example in FIG. 10 depicts a section of the STUDENT LOG for one student that provides a compendium of the actual teacher instructional sequences and evaluation scores for each objective for each week, organized by curriculum groups, for all weeks of the academic year. The weekly succession of learning scores a student receives for each specific objective is presented across the course of the year. The most recent score received is also "brought forward" in an initial left hand column titled "LAST" for viewer convenience. Four additional columns (E1, E2, E3, E4) inserted into the weekly sequence afford space for evaluations from teacher-independent sources for any or all, objectives, if and when these are available. Evaluation scores of 1 or "teaching and learning incomplete" are accented in red to attract viewer attention. A double row space, above the weekly column of the screen is provided for noting supplementary information or individual special tutorial actions.

Figure 11:
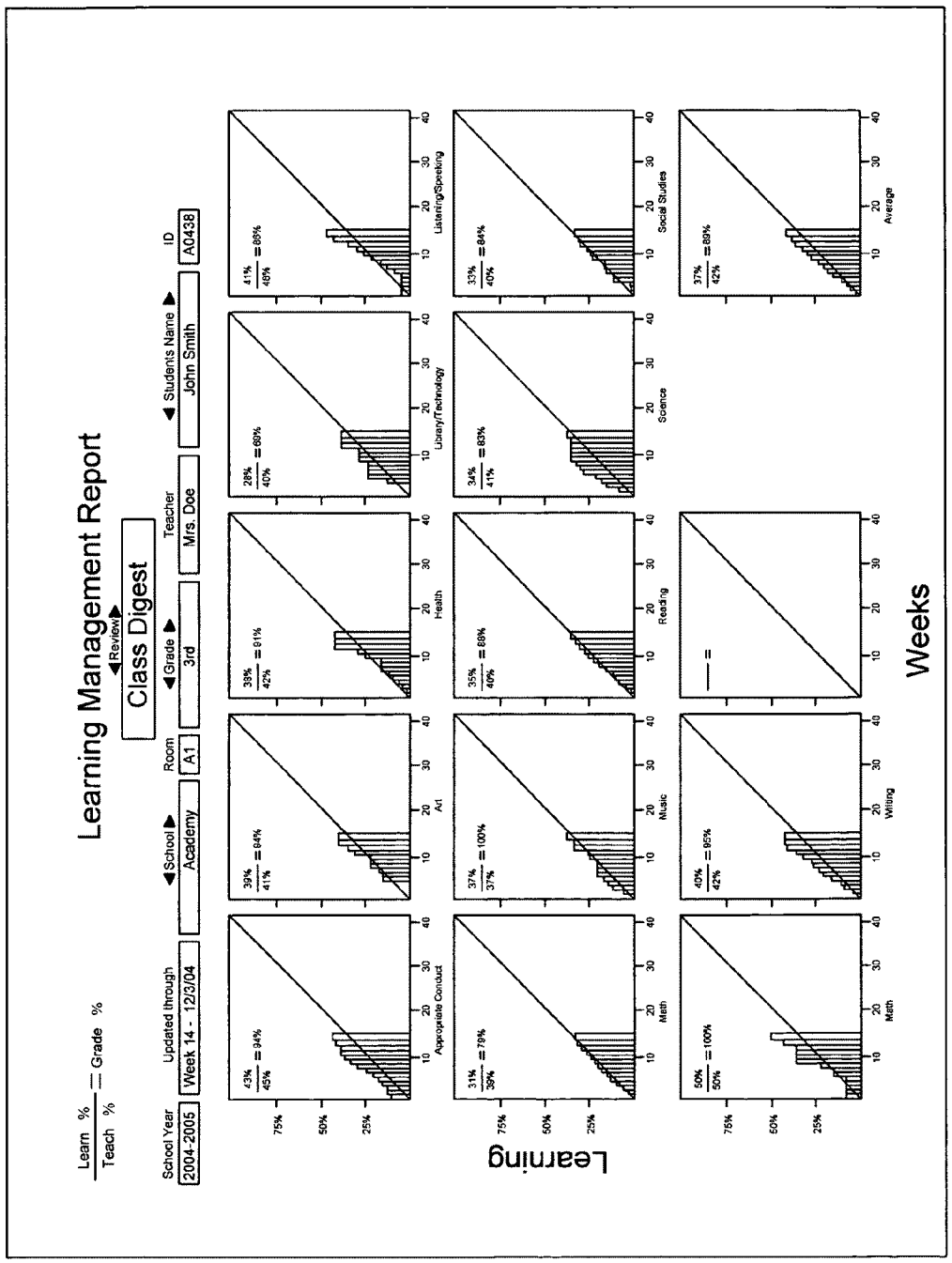
FIG. 11 is an illustration of the STUDENT DIGEST generated by the LEARNING MANAGEMENT REPORT of the present invention.

The voluminous material of a student log is available in summary as illustrated in the example of FIG. 11. The summary is termed the STUDENT DIGEST and presents, weekly, for each student, a cumulative bar graph cumulating the student's progressive, level of learning, for each curricular area (i.e., math, science, reading, etc.), up to the current week of the academic year. If an instructor were to evenly introduce the objectives of a specific curricular area over the course of the academic year, and the student consistently mastered these objectives as they were presented, the corresponding graph would rise in a progressive, roughly linear ascent starting from 0% at the beginning of the year and rising to 100% at the end of the year. The rate of teaching (objective introduction) coupled with the efficiency of student learning (grade) together produces the total learning, and variations in either teaching or student efficiency (grade) therefore affect the learning measure presented.

For example, a graph depicting a 90% learning level halfway through the year (week 20), would indicate that the instructor introduced a majority of the objectives for a specific curricular area in the first half of the year, and the student mastered those objectives. In contrast, a graph depicting a 25% learning level halfway through the year could indicate one of several things; the instructor had not yet introduced many of the objectives for a specific curricular area, or, the instructor had introduced the objectives but the student had not yet mastered the material.

The STUDENT DIGEST depicts the general educational accomplishment to date for each student, for each entire individual curricular area, and, additionally, a more general overview of performance for the entire curriculum. In each of the STUDENT DIGEST graphs, the angular guideline provides the viewer a benchmark representing the progressive learning mastery of all objectives taught to date. Additionally, the actual numerical value for the three cardinal elements known by this invention; teaching ("TEACH"), cumulative learning ("LEARN") and the derived estimate of a student's learning efficiency ("GRADE"), are provided for each curriculum grouping.

The material presented by the STUDENT DIGEST is further available as summarized, and can be referenced by the STUDENT/CLASS PERFORMANCE RANGES table.

One example of this more general performance analysis is shown in FIG. 12. Here, the two components of current learning performance, total learning & learning efficiency or grade, are shown for each student in a particular classroom for each curriculum area. This graphic presentation is formatted to initially present the data hierarchically according to each student's overall average grade. An independent navigation target allows the selection of alternate criterion for ranking learning performances, either by "grade" or by "learn" scores according to the various individual curricular areas. Performances with an average grade below 75% are accented in red to attract viewer attention. This screen allows the summary examination of each individual student's total performance in each curricular area as well as the student's learning efficiencies (grades) referenced to other classmates.

The information contained in the three individual student performance graphs can be summarized for an entire classroom. A running log of entire classroom activity (FIG. 13) is provided by the CLASSROOM LOG. This summary presents, for all students as a group, the average total learning score for each objective, for each week, organized by curricular groups, for all weeks of the academic year. In analogous fashion to the STUDENT LOG described earlier, the CLASSROOM LOG presents the actual, average numerical accomplishment for the entire classroom group in full detail across the academic year. Presented scores are multiplied by 10 to eliminate decimals. Here, just as with the STUDENT LOG, average group scores below 75% mastery are highlighted in red to prompt viewer attention. Just as with the STUDENT LOG, there are columns (E1, E2, E3, E4) interspersed in 4 places within the year for recording teacher-independent information regarding performance. One feature of this graphic presentation is the direct portrayal of relative difficulty of different objectives for the entire class of students.

Figure 14:
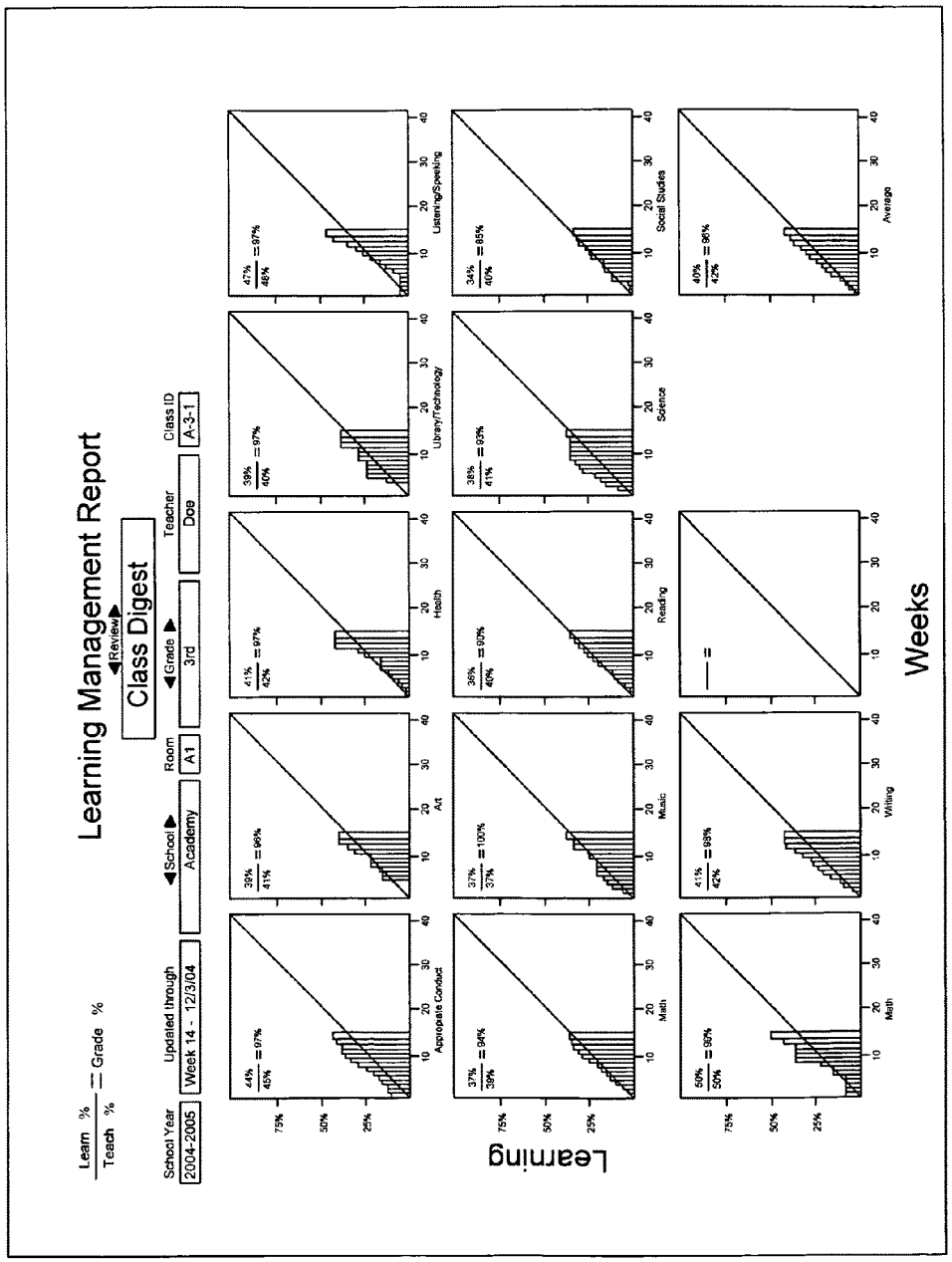
FIG. 14 is an illustration of the CLASSROOM DIGEST generated by the LEARNING MANAGEMENT REPORT of the present invention.

The broadest overview of general classroom performance is the CLASSROOM DIGEST. FIG. 14 illustrates an example of the CLASSROOM DIGEST which presents, for the entire classroom, a series of cumulative bar graphs indicating summary learning progress for each curricular area of study up to the current week. Here, as with the STUDENT DIGEST, data is summarized across entire curricula and accumulated across the weeks of the school year to portray major trends in progress of accomplished (mastery) learning. In addition to the bar graphs, entire class learning performance can also be presented in numerical terms, wherein, for example, the total progress to date of learning ("LEARN") is divided by the total teaching to date associated with these learning results ("TEACH") to yield the overall efficiency of learning ("GRADE"). Here as well, a solid guideline from zero to 100% learning allows the viewer to rapidly scan the performance of the entire class for progress throughout the year as it may lag or lead this standard.

Users of the LEARNING MANAGEMENT REPORT are provided with the ability to rapidly move between individual student reports and group reports, as well as across individual students, groups, grades and curricular areas. Such facility to rapidly move between different reports which are very frequently generated, establishes for the viewer the opportunity to spot trends, individual variations, curricular difficulties and teaching patterns. Such analysis allows for the early detection of potential problems and/or opportunities that would otherwise not be seen by conventional long-intermittent academic planning and grading systems. In contrast, THE LEARNING MANAGEMENT REPORT is always current, being updated at virtually the same rapid pace as the educational dynamics of the classroom.

What is claimed is:

1. A computer-implemented classroom programming method for overseeing and adjusting and strengthening the instruction by a teacher and learning by students during an academic year with respect to one or more topics of study for a grade level over a plurality of successive evaluation periods, comprising the steps of:

analyzing a subject matter of an academic course of study in detail and subsequently breaking down the totality of knowledge of the subject matter that the teacher is expected to teach and each student is expected to learn during said academic year into a plurality of discretely defined behavioral performances that are designed to be readily and objectively recognized as being mastered or not by the student;

storing the plurality of discretely defined behavioral performances into a computer system comprising at least a first computerized database system which organizes the plurality of discretely defined behavioral performances on the basis of structural and functional groupings as well as conventional levels of difficulty or advancement, said first computerized database system storing a teaching and learning state score respectively for each of said plurality of discretely defined behavioral performances, said teaching and learning state score comprising a selected one of successive first, second and third scores wherein said teaching and learning state score is changeable successively from said first score to said second score and then from said second score to said third score to indicate a current state of teaching and learning, said first score indicating that instruction has not begun and learning has not begun, said second score indicating that instruction has begun but actual learning is not complete, and said third score indicating that instruction and actual learning are complete, each one of the plurality of discretely defined behavioral performances having said teaching and learning state score initially being set to said first score for each of said plurality of discretely defined behavioral performances in said first computerized database system prior to instruction thereof during said academic year wherein said first score represents that instruction has not begun and learning has not begun;

subdividing said grade level into a plurality of progress intervals wherein each said progress interval is subdivided into a plurality of said evaluation periods;

for each specified one of said evaluation periods of the classroom, developing a teaching and learning plan by designating one or more of the discretely defined behavioral performances stored in the first computerized database as learning objectives for said teaching and learning plan that are to be taught by the teacher and learned by the students during said evaluation period;

after said designation of said learning objectives of said teaching and learning plan, changing said teaching and learning state score for each respective one of said learning objectives by successively replacing said first score in said first computerized database with said second score to represent that instruction of each said learning objective has begun but actual learning is not complete;

instructing said learning objectives of said teaching and learning plan during said evaluation period;

through the end of each specified one of said evaluation periods, said teacher evaluating a performance of each student during said specified evaluation period to determine an actual ability of each of the students during the course of said evaluation period to carry out the one or more discretely defined behavioral performances designated as said learning objectives over the course of the evaluation period and recording the results of the evaluation in real time into the first computerized database system by either retaining said second score as said teaching and learning state score or else replacing said second score with said third score to indicate whether each of the teachers and students has progressed from teaching and learning not complete to teaching and learning complete for each of the learning objectives, said recording being performed by either changing said teaching and learning state score by replacing said second score with said third score for each said learning objective evaluated as teaching and learning complete, or else maintaining said teaching and learning state score as said second score for each said learning objective evaluated as teaching and learning not complete;

automatically generating a dynamic classroom teaching chart by said computer system during said evaluation period providing a real time visual representation of each of the student's learning progress for one or more of the learning objectives for the specified evaluation period wherein said real time visual representation corresponds to the selected one of said first, second and third scores currently stored as said teaching and learning state score;

updating said dynamic classroom teaching chart continuously during said evaluation period upon each change of a said student's learning progress from teaching and learning not complete to teaching and learning complete for each of said learning objectives by changing said teaching and learning state score by replacing said second score with said third score for each said learning objective evaluated as learning complete;

visually presenting said dynamic classroom teaching chart by said computer system on a display during the course of said evaluation period to automatically show each update of said dynamic classroom teaching chart upon each change of a said student's learning progress and to show the current teaching and learning state status of said learning objectives as learned as indicated by said third score or not learned as indicated by said second score; and said computer system including a second computerized database system, wherein at the end of each specified evaluation period, automatically transferring the recorded results of the evaluation from said first computerized database system to said second computerized database system that collects evaluation results for each teacher and student, for every evaluation period, for every class, and automatically organizes the plurality of collected evaluation results into an interactive learning management report that is presented to a reviewer in real time to display a variety of levels of detail ranging from a specific level, including a specific subject matter for a specific teacher and student, to a general level of detail, including the overall performance of a classroom or school over a specified period of time;

continual parent or guardian oversight of the teacher's and student's progress and performance is maintained by the additional steps of:

generating a preview report at the beginning of each specified evaluation period respectively for the teacher and each student and distributing the respective preview report to at least one parent or guardian of each student, said preview report listing each of the learning objectives designated for instruction for the specified evaluation period for said student;

generating an evaluation report at the end of each specified evaluation period respectively for the teacher and each student and distributing the respective evaluation report to at least one parent or guardian of each student, said evaluation report listing each of the learning objectives designated for instruction for the specified evaluation period along with the associated evaluation results of the teacher's and student's performance for the specified evaluation period as indicated by said teaching and learning state score for each of said learning objectives.

2. The method according to claim 1, further comprising the step of strengthening a learning performance of the student by automatically presenting, directly to the student during said evaluation period, at least one of a non verbal recognition and other reward for learning progress.

3. The method according to claim 1, wherein the dynamic classroom teaching chart provides a real time visual representation of the actual teaching and learning progress for each teacher and student and for the entire class during said evaluation period by continuously updating said dynamic classroom teaching chart by said computer system and said computer system displaying an indication of the teaching and learning state status of said learning objectives as learned or not learned.

4. The method according to claim 3, wherein said computer system operates such that the dynamic classroom teaching chart displays a real time, continuously adjusted, cumulative total mastery score for a teacher and an entire class of students for one or more selected learning objectives in combination with said displayed indication of said teaching and learning state status of said learning objectives.

5. The method according to claim 1, wherein at least one of the preview report and evaluation report further includes a comments section for remarks made by an instructor and directed to the parent or guardian.

6. The method according to claim 1, wherein said first score is a zero, said second score is a one, and said third score is a two, and wherein each teacher and student has said teaching and learning state score for each said learning objective changed by said computer system from zero to one in the beginning of instruction and then from one to two by said computer system for any of the learning objectives evaluated as learning complete upon being evaluated with respect to any one learning objective to indicate the teaching and learning state status of said learning objective.

7. The method according to claim 6, wherein:
a score of zero represents that instruction of that specific learning objective has not yet begun;
a score of one represents the status of teaching and learning not complete indicating instruction of that specific learning objective has begun but that learning is not yet complete; and
a score of two represents the status of teaching and learning complete indicating instruction and learning of that specific learning objective is complete.

8. The method according to claim 1, wherein the first computerized database system resides within a locally managed computer of said computer system that is locally managed with respect to the classroom, while the second computerized database system resides within a remote computer of said computer system associated with a school district office or other school administrative body for generation and distribution of said evaluation report to said parent or guardian of said student and said learning management report to teachers and managers.

9. The method according to claim 8, wherein the remote computer generally functions as one of a secondary data repository, a data management and analysis tool, and an information distribution network controller for remote management participation.

10. The method according to claim 8, wherein the locally managed computer and the remote computer connect to at least one of a local area network (LAN) and wide area network (WAN), or alternatively, connect to each other by means of a direct connection.

11. The method according to claim 1, wherein said teacher selects one or more of the discretely defined behavioral performances for designation as a said learning objective.

12. The method according to claim 1, wherein the first computerized database selects one or more of the discretely defined behavioral performances for designation as a said learning objective on the basis of at least one predetermined criteria.

13. The method according to claim 1, wherein said progress interval is a quarterly period of the academic year comprising a plurality of said evaluation periods, each extending at least a week, and the method further comprising the step of automatically generating a quarterly progress report by said computer system for each teacher and student at appropriate ones of said progress intervals throughout an academic year, the quarterly progress report listing all selected learning objectives for the academic year, as well as the evaluation results for that teacher and student for each specific learning objective covered to date wherein each of said selected learning objectives includes an indicator associated therewith representing said teaching and learning state score of either said first score, said second score or else said third score for each said learning objective and each said specified evaluation period.

14. The method according to claim 1, wherein if a teacher and student are evaluated on a learning objective two or more times over the course of an academic year, the latter evaluation result is recorded as either said second score or else said third score at the appropriate temporal position within an ongoing record and does not erase any previous evaluation results.

15. The method according to claim 1, wherein the step of organizing the plurality of collected evaluation results into a learning management report further comprises the step of generating a student log by said computer system that provides a compendium of instructional objectives introduced to date, along with the associated evaluation results of the teacher and student for each learning objective for each specified evaluation period, organized by curriculum groups, for an entire academic year.

16. The method according to claim 1, wherein the step of organizing the plurality of collected evaluation results into a learning management report further comprises the step of generating a student digest by said computer system that presents, for each teacher and student, a cumulative bar graph depicting a teacher's and student's progressive level of teaching and learning for each curricular area of study over a successive plurality of said evaluation periods.

17. The method according to claim 1, wherein the step of organizing the plurality of collected evaluation results into a learning management report further comprises the step of generating a student/class performance ranges table by said computer system wherein said computer system calculates and said student/class performance ranges table depicts, for the teacher and for each student within a specified class, the percentage of learning objectives learned to date for each specific curriculum group, as well as the teacher's and student's learning efficiency for that curriculum group, and the teacher's and student's overall evaluation results, represented as a percentage, for all curriculum groups.

18. The method according to claim 1, wherein the step of organizing the plurality of collected evaluation results into a learning management report further comprises the step of generating a classroom log by said computer system wherein said computer system calculates and said classroom log depicts an average total score for the evaluation results of a teacher and class as a whole, for each evaluation period, for each learning objective.

19. The method according to claim 1, wherein the step of organizing the plurality of collected evaluation results into a learning management report further comprises the step of generating a classroom digest by said computer system wherein said computer system generates and said classroom digest presents, for an entire classroom, a cumulative bar graph depicting the teacher's and classroom's progressive level of teaching and learning for each curricular area of study.

20. A computer implemented method to equip distant school administrators to remotely establish, monitor and assure an annual production of learning over a school year by one or multiple classrooms each comprising teacher and student participants, the method comprising the steps of:
- remotely developing an academic plan by employment of a computer system comprising a computerized primary classroom database system and a computerized secondary remote database system, and imposing upon the classroom with said remote database system a detailed, unambiguous annual assignment of learning requirements for the production of learning by the classroom;
- remotely standardizing, regulating and overseeing expected result, procedural sequences and schedule of the classroom learning production, said classroom learning production being implemented by a computer-based learning production process implemented by said primary classroom database system and said secondary remote database system;
- remotely measuring the classroom learning production by recording individual teaching and learning objectives by said primary classroom database system and measuring teaching and learning progress and teaching and learning results in the classroom by said secondary remote database system which automatically receives and processes data received from said primary classroom database system;
- integrating a system of real-time recording and tracking of learning and teaching production in the classroom into the learning production process by recording and tracking teaching and learning with said primary classroom database system;
- automatically and remotely adjusting the progress of teaching to variations in the progress of learning; and
- remotely tracking and assimilating learning production throughout the school year in one or multiple classrooms by said secondary remote database system;
- wherein measuring the classroom learning production by measuring teaching and learning progress and teaching and learning results in the classroom is remotely accomplished by the additional steps of:
- management employing a measurement structure with features sensitive to the condition that: (1) classroom learning production is the terminal result of an extended cooperative joint process of teacher and student that can be termed "teaching and learning"; (2) measurement incorporates identification of this cooperative process, as well as the
- individual contribution of the teacher and student participants, as well as the final result of the individual and combined effort of the teacher and student participants; (3) defining features of performance measures are sufficiently clear and distinct to assure high measurement reliability; (4) units of measurement are suitable to sensitively detect the small changes of progress which may occur in brief classroom intervals; (5) the units of measurement are suitable to aggregate across many observations; and (6) the measures are a three term nominal measurement scale of three categories, comprising categories A, B and C respectively defined by states "0", "1" or "2" wherein: category A corresponds to said state "0" which equals "teaching (instruction) and learning not begun" which is the state existing when the classroom is in session but neither said state 1 nor said state 2 exist; category B corresponds to said state "1" which equals "teaching (instruction) and learning begun" which is the measured state existing when the classroom is in session, the teacher has introduced the required learning performance objective to a specific student but state "2" does not exist for the particular objective; and category C corresponds to state "2" which equals "teaching (instruction) and learning complete" which is the measured state existing when the classroom is in session, the teacher has introduced a required learning performance objective to a specific student and the teacher concludes teaching and that student demonstrates complete performance of the learning performance objective; and wherein the step of remotely standardizing, regulating and overseeing the procedural sequences and schedule of the classroom learning production are accomplished by the additional steps of:
- management assigning to the classroom, intermediate materials and activities required to produce completed teaching and learning in the form of a classroom computer guidance system defined by said primary classroom database system and comprising a series of interactive classroom objectives display screens, which prompt management-specified teacher performance, in a management specified fixed order, according to management specified time periods throughout the school year; and
- by interconnection with additional computer systems defined by said secondary remote database system at other management stations, maintaining real-time oversight of each step and result of the classroom learning production by:
1) establishing as a first required step, that the teacher designate on a computer system provided WEEKLY PREVIEW screen, each teaching and learning objective of a current weekly production cycle from a library of objectives to define a planned weekly production schedule, then composing parent announcements, on the computer system provided WEEKLY PREVIEW screen, then posting a completed production schedule, automatically by printed report to all parents, and automatically by computer network to all management stations; said posting also entering, automatically for all students, a score of "1" on a computer system provided WEEKLY EVALUATION REPORT, without additional query and thereby recording "teaching and learning has begun" there on the classroom computer guidance system as a learning state score of "1" and also to said secondary remote database system accessed at the remote management stations to indicate that the teaching and learning has begun;
2) the teacher and students thereafter commencing teaching and learning of each designated objective for the weekly learning production cycle, and entering and revising said teaching and learning state scores before the end of the weekly learning production cycle;
3) choosing one of the designated weekly objectives listed on the interactive display screen for a CLASSROOM TEACHING CHART and, entering in said primary classroom database system for each student a "1" as teaching and learning for that student commences, proceeding thereafter through each designated objective in the "1" state of teaching and learning, while simultaneously observing and recording with each student whether learning is mastered or not and when present, entering a score of "2" in said primary classroom database system indicating "teaching and learning complete" which is automatically posted by said computer system without additional query to the classroom WEEKLY EVALUATION REPORT and remote management station computers; and 4) at the end of the weekly learning production cycle, referencing the WEEKLY EVALUATION REPORT, auditing the compiled teaching and learning state scores for every designated objective, and for each attending student, composing and entering parent production results announcements therein, and posting the WEEKLY EVALUATION REPORT automatically by communications to parents and automatically without additional query in real time by computer network to all of the management stations, such that a manager is continuously informed of the planned weekly production schedule, as well as minute by minute progress through the production schedule and the end-of-week schedule production results.

21. The method according to claim 20, wherein said detailed, unambiguous annual assignment of classroom learning production is established by the additional steps of:

management composing and establishing in said secondary remote database system said detailed, unambiguous annual assignment for each grade level and for each chosen general knowledge area by:

1) creating or adapting from published sources, a rational subdivision of each knowledge area according to natural, or culturally practiced, structural and functional distinctions, into fractional portions of the knowledge area;
2) further dividing each fractional portion into a plurality of discrete components whereby each component has a component description which is: (A) a description of an overt behavior which may be demonstrated or exemplified by a said teacher and, with practice, perfectly imitated so as to be mastered, by a said student; (B) is related to, and practically follows and precedes other of said components; (C) is easily recognized, and distinguished by any alert independent adult observer, as being present or absent in a teacher's or student's performance without requiring any further fractionation to improve recognition; (D) the components are used individually or as combinations together; (E) the plurality of discrete components are hierarchically organized according to a best order of teaching and learning; and (F) span a range of said components sufficient to adapt to individual differences in historic grade level preparation; and
3) subsequently the school administrator establishing a detailed, unambiguous classroom learning syllabus, along with all other syllabi appropriate to a particular classroom, in a declarative manner suitable to establish such syllabi to be the classroom learning assignment, by installing these syllabi into said primary classroom database system to establish the annual assignment of classroom learning production, said annual assignment being continuously monitored and adjusted relative to current teaching and learning production automatically by said computer system.

22. The method according to claim 20, wherein the step of automatically and remotely adjusting the progress of teaching to variations in the progress of learning is accomplished by the additional steps of:

establishing classroom conditions where teaching and learning production proceeds by small objectives across frequent, brief production periods by the following step:

permitting a teacher to observe from the WEEKLY EVALUATION REPORT displayed on a classroom screen, or from a weekly update of a STUDENT LOG screen of a LEARNING MANAGEMENT REPORT for any particular learning objective, for an individual student, the measured state teaching and learning state score of "1" wherein the teacher is thereby automatically prompted by a persistent indicator prior to the next weekly production plan cycle to continue teaching and learning that objective in a forthcoming one of said weekly production plan cycle.

23. The method according to claim 20, wherein the capability for remotely tracking and assimilating learning production throughout the school year in one or multiple classrooms is accomplished by the additional steps of:

employing a computer server and network connected to each said primary classroom database system in a remotely-located plurality of said classrooms and to a management server computer system which comprises said secondary remote database system to directly accept in real time, all information generated at each said classroom, and operating system software to store, aggregate, condense, summarize, abstract and update said information across each school week of the school year to define formulated information, and remotely display such formulated information at a manager's computer station;

automatically without additional query providing a composite report which is thematically organized to display teaching and learning information from most general to most specific as referenced respectively from a longest to a shortest time sample, thus permitting user friendly data examination and management preparedness, to generate a LEARNING MANAGEMENT REPORT, said LEARNING MANAGEMENT REPORT comprising:

a CLASS DIGEST screen which pictorially presents on a computer display accumulated episodes of teaching and learning for all students, of all learning units of each curricular area, accumulated across the school weeks of the school year, the display separately depicting total teaching, a rate of teaching, teaching efficiency, rate of learning, total learning, and learning efficiency for all subject matter and for all students of the classroom combined, such that where these classroom dynamics may fluctuate throughout the school year, a manager can frequently observe temporal trends of production, and total teaching and learning production of the classroom including its teacher and students, and by selection, other said classrooms which promptly alerts the manager to classroom production problems;

a CLASS LOG screen which displays the same information as said CLASS DIGEST but is expanded to report for each said objective by options which are the same as said CLASS DIGEST, but as tabular numerical data arranged temporally in left-to-right rows reflecting productions weeks and arranged by standards in columns, said data providing necessary information to permit audit calculations, observation of the temporal trends and/or a serial order of the objectives of teaching and learning, and special investigations of the functionality of individual objectives and suitability of the order of presentation of the objectives;

a PERFORMANCE RANGES screen which displays average learning efficiency and total learning accumulated across all school weeks to date, for each student of a classroom within a group ranked high to low, according to overall curriculum or if selected, any specific curriculum and by either total learning or learning efficiency, thereby permitting a manager to observe the learning efficiency or total learning of a student as ranked relative to other classmates, according to any curricular area, thereby providing the information necessary for management to promptly assign special remedial or accelerating learning;

a STUDENT DIGEST screen which pictorially presents, for each individual student, the cumulative episodes of teaching and learning, within each curricular area, across all attendance weeks and thereby, separately depicts total teaching, rate of teaching, teaching efficiency, rate of learning, total learning, learning efficiency related to individual student, thereby permitting the manager to witness the temporal trends of production progress and unwarranted variations with any particular student, in preparation for management adjustments;

a STUDENT LOG which presents the same information but expanded to report for each objective, by the same options, as the STUDENT DIGEST but as tabular numerical data, temporally arranged in left to right rows reflecting production weeks and in columns by objective, to allow audit calculations, and facilitating review of the temporal pattern of both teaching and learning of an individual student or subgroup of students perhaps requiring special guidance; and classroom procedures screens, said screens including a WEEKLY PREVIEW screen and a WEEKLY EVALUATION SCREEN comprising the real time, remotely generated, classroom learning production procedures which instantaneously report the establishing conditions and ongoing details of teaching and learning progress within the classroom as occurring at the moment, permitting the manager to relate the antecedent classroom conditions to production outcomes, thereby guiding the search for primary causes of learning production difficulty.

\* \* \* \* \*